US012598563B2

(12) United States Patent
Pan et al.

(10) Patent No.: US 12,598,563 B2
(45) Date of Patent: Apr. 7, 2026

(54) SYNCHRONIZATION BLOCK ASSOCIATION AND SYSTEM INFORMATION RECEPTION

(71) Applicant: InterDigital Patent Holdings, Inc., Wilmington, DE (US)

(72) Inventors: Kyle Jung-Lin Pan, Saint James, NY (US); Fengjun Xi, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 204 days.

(21) Appl. No.: 16/583,314

(22) Filed: Sep. 26, 2019

(65) Prior Publication Data

US 2020/0100197 A1     Mar. 26, 2020

Related U.S. Application Data

(60) Provisional application No. 62/736,815, filed on Sep. 26, 2018.

(51) Int. Cl.
| | |
|---|---|
| H04L 12/00 | (2006.01) |
| H04W 24/08 | (2009.01) |
| H04W 56/00 | (2009.01) |
| H04W 72/044 | (2023.01) |
| H04W 72/0446 | (2023.01) |
| H04W 72/30 | (2023.01) |

(52) U.S. Cl.
CPC ......... H04W 56/001 (2013.01); H04W 24/08 (2013.01); H04W 56/004 (2013.01); H04W 72/0446 (2013.01); H04W 72/0466 (2013.01); H04W 72/30 (2023.01)

(58) Field of Classification Search
CPC . H04W 56/001; H04W 24/08; H04W 56/004; H04W 72/005; H04W 72/0446; H04W 72/0466
See application file for complete search history.

(56) References Cited

U.S. PATENT DOCUMENTS

| | | | |
|---|---|---|---|
| 2018/0139084 A1* | 5/2018 | Jung | H04J 11/0069 |
| 2018/0192383 A1* | 7/2018 | Nam | H04W 72/23 |

(Continued)

OTHER PUBLICATIONS

ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.

*Primary Examiner* — Noel R Beharry
*Assistant Examiner* — Lionel Preval
(74) *Attorney, Agent, or Firm* — Condo Roccia Koptiw LLP

(57) ABSTRACT

Systems, methods, and instrumentalities are described herein that may be associated with SS block (SSB) timing acquisition (e.g., for new radio unlicensed (NR-U) operations). A wireless transmit receive unit (WTRU) may detect/decode an SSB. The WTRU decoding the SSB may include the WTRU decoding a PBCH payload. The PBCH payload may be scrambled with a first scrambling code, channel coded, and scrambled with a second scrambling code. The WTRU may acquire information associated with the SSB that includes one or more of: a transmission occasion time index, a block time index, or a time offset. The WTRU may use one or more of the acquired parameters to determine a timing associated with the SSB.

8 Claims, 14 Drawing Sheets

(56) References Cited

U.S. PATENT DOCUMENTS

| | | | |
|---|---|---|---|
| 2018/0227867 A1* | 8/2018 | Park | H04L 5/005 |
| 2019/0058620 A1* | 2/2019 | Liu | H04L 27/06 |
| 2019/0081827 A1* | 3/2019 | Ly | H04J 11/0069 |
| 2019/0104502 A1* | 4/2019 | Wu | H04L 1/0058 |
| 2019/0313350 A1* | 10/2019 | Zhang | H04B 7/12 |
| 2020/0187135 A1* | 6/2020 | Liu | H04W 48/12 |
| 2020/0213973 A1* | 7/2020 | Lee | H04W 56/001 |
| 2020/0228275 A1* | 7/2020 | Li | H04W 56/0025 |
| 2020/0259588 A1* | 8/2020 | Iyer | H04L 5/0007 |
| 2020/0336158 A1* | 10/2020 | Uesaka | H03M 13/13 |

* cited by examiner

| NR-U Time Shift | NR-PBCH payload |
|---|---|

Perform the first scrambling using a first scrambling code

| The first Scrambling Code |
|---|

NR-U time shift is not scrambled

| NR-U Time Shift | Scrambled NR-PBCH payload |
|---|---|

Attach CRC for NR-U time shift and PBCH payload

| NR-U Time Shift | Scrambled NR-PBCH payload | CRC |
|---|---|---|

Perform channel coding on the scrambled PBCH

| Channel coding (e.g., Polar Code) |
|---|

Perform the second scrambling using a second scrambling code

| The Second Scrambling Code |
|---|

Perform the second scrambling using a second scrambling code

| Scrambled PBCH Payload including NR-U Time Shift |
|---|

FIG. 4

SYNCHRONIZATION BLOCK ASSOCIATION AND SYSTEM INFORMATION RECEPTION

CROSS-REFERENCE TO RELATED APPLICATIONS

This application claims the benefit of U.S. Provisional Patent Application No. 62/736,815, filed Sep. 26, 2018, the contents of which are incorporated by reference.

BACKGROUND

Use cases for emerging 5G systems may include Enhanced Mobile Broadband (eMBB), Massive Machine Type Communications (mMTC) and/or Ultra Reliable and Low Latency Communications (URLLC). Different use cases may focus on different requirements such as higher data rate, higher spectrum efficiency, low power and higher energy efficiency, lower latency and/or higher reliability. A wide range of spectrum bands (e.g., ranging from 700 MHz to 80 GHz) may be considered for a variety of deployment scenarios.

SUMMARY

Systems, methods, and instrumentalities are described herein that may be associated with SS block (SSB) timing acquisition (e.g., for new radio unlicensed (NR-U) operations). SSB may refer to an SS/PBCH block as discussed herein. A wireless transmit receive unit (WTRU) may detect/decode an SSB. The WTRU decoding the SSB may include the WTRU decoding a PBCH payload. The PBCH payload may be scrambled with a first scrambling code, channel coded, and scrambled with a second scrambling code. The WTRU may acquire information associated with the SSB that includes one or more of: a transmission occasion time index, a block time index, or a time offset. The WTRU may use one or more of the acquired parameters to determine a timing associated with the SSB. The transmission occasion time index may be channel coded and scrambled with the second scrambling code. The transmission occasion time index may not be scrambled with the first scrambling code. If the SSB is not from a first transmit occasion, the WTRU may determine the timing associated with the SSB based on the transmission occasion time index, the block time index, and the time offset. If the detected SSB is from a first transmit occasion, the WTRU may determine the timing associated with the SSB based on the block time index and the time offset. The timing associated with the SSB may comprise one or more of the following: a frame boundary, a subframe boundary, a slot boundary, or a symbol timing.

BRIEF DESCRIPTION OF THE DRAWINGS

A more detailed understanding may be had from the following description, given by way of example in conjunction with the accompanying drawings wherein.

Figure 1A:
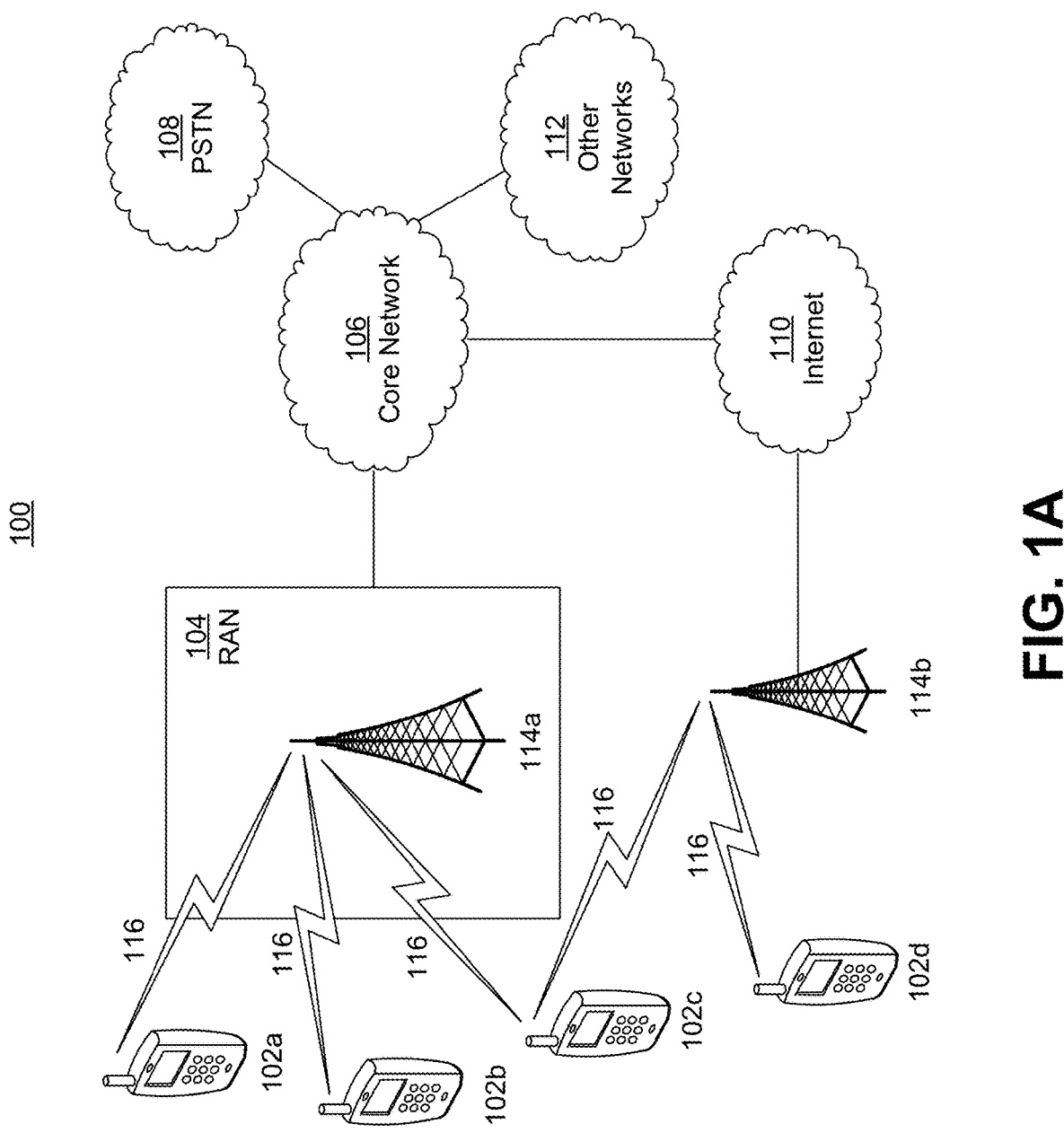
FIG. 1A is a system diagram illustrating an example communications system in which one or more disclosed embodiments may be implemented.
Figure 1B:
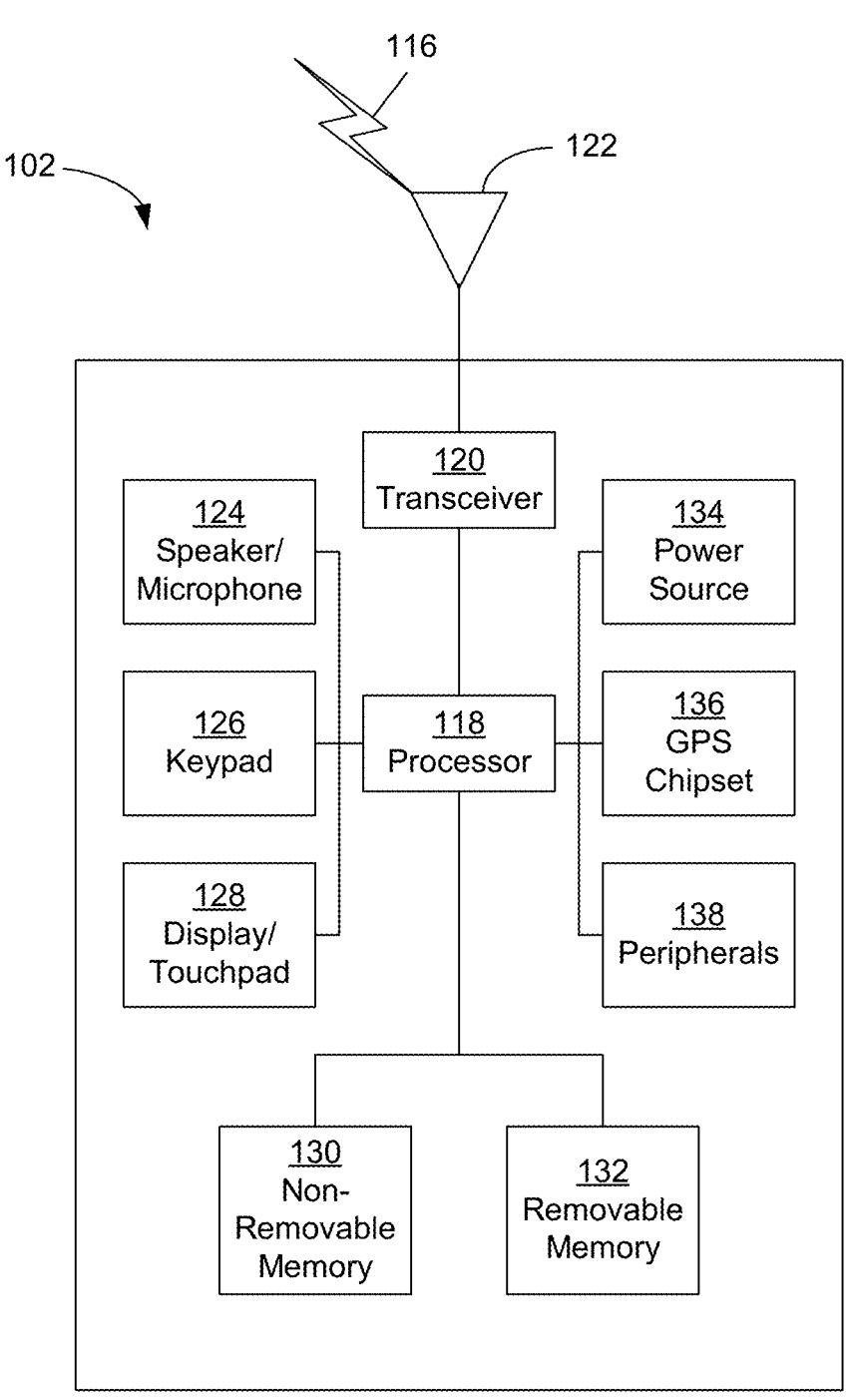
FIG. 1B is a system diagram illustrating an example wireless transmit/receive unit (WTRU) that may be used within the communications system illustrated in FIG. 1A according to an embodiment.
Figure 1C:
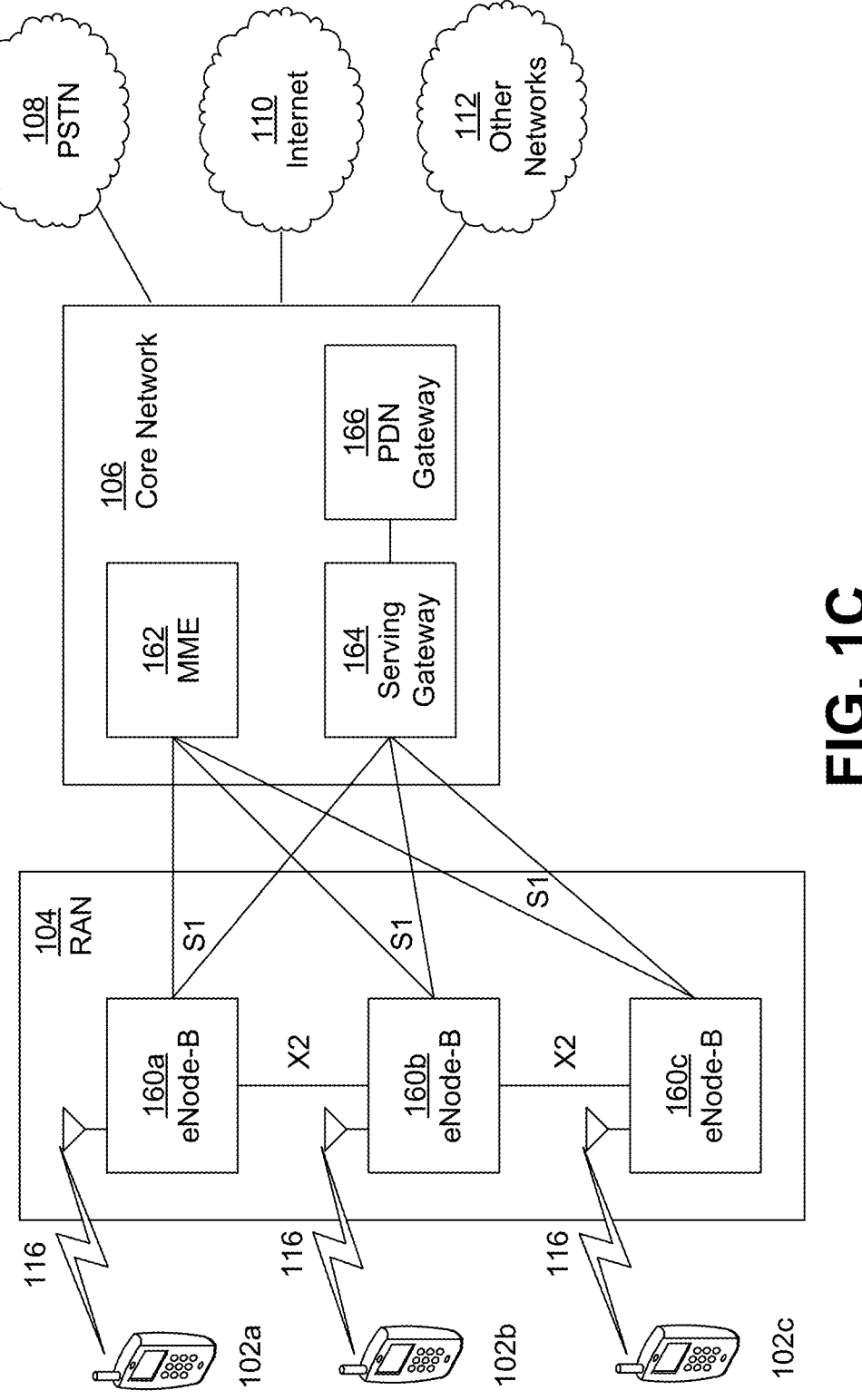
FIG. 1C is a system diagram illustrating an example radio access network (RAN) and an example core network (CN)
Figure 1D:
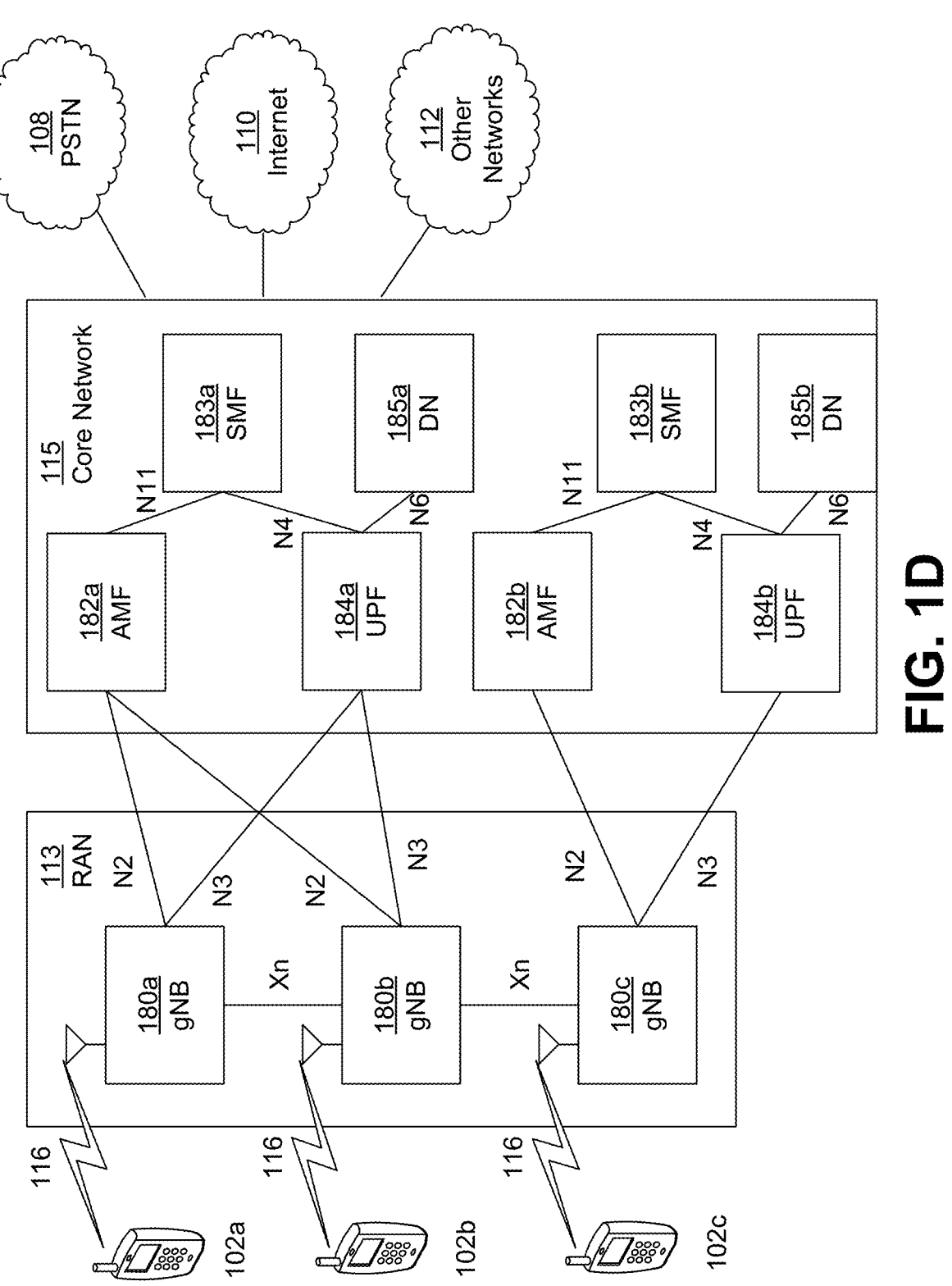
Figure 2:
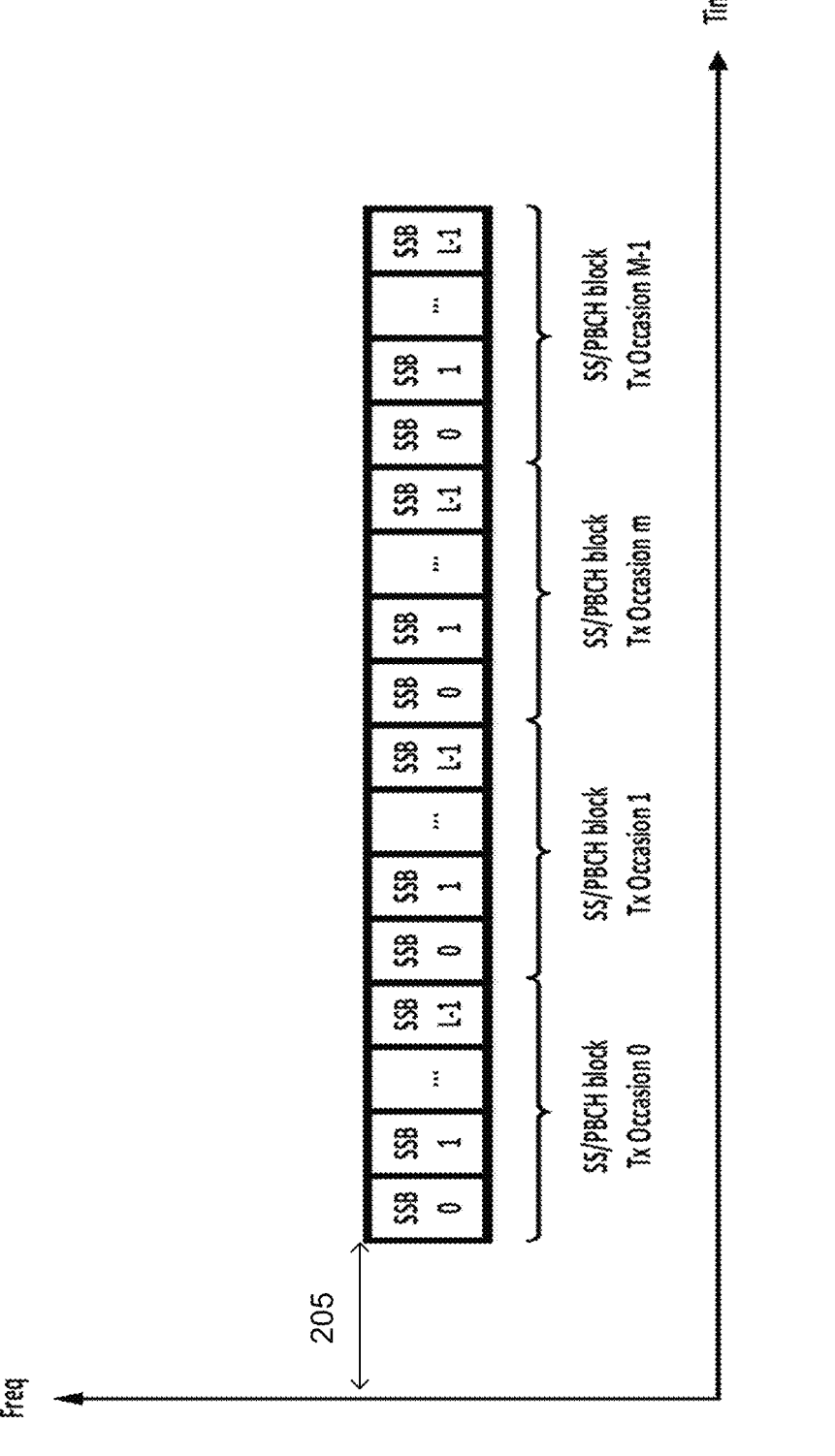
Figure 3:
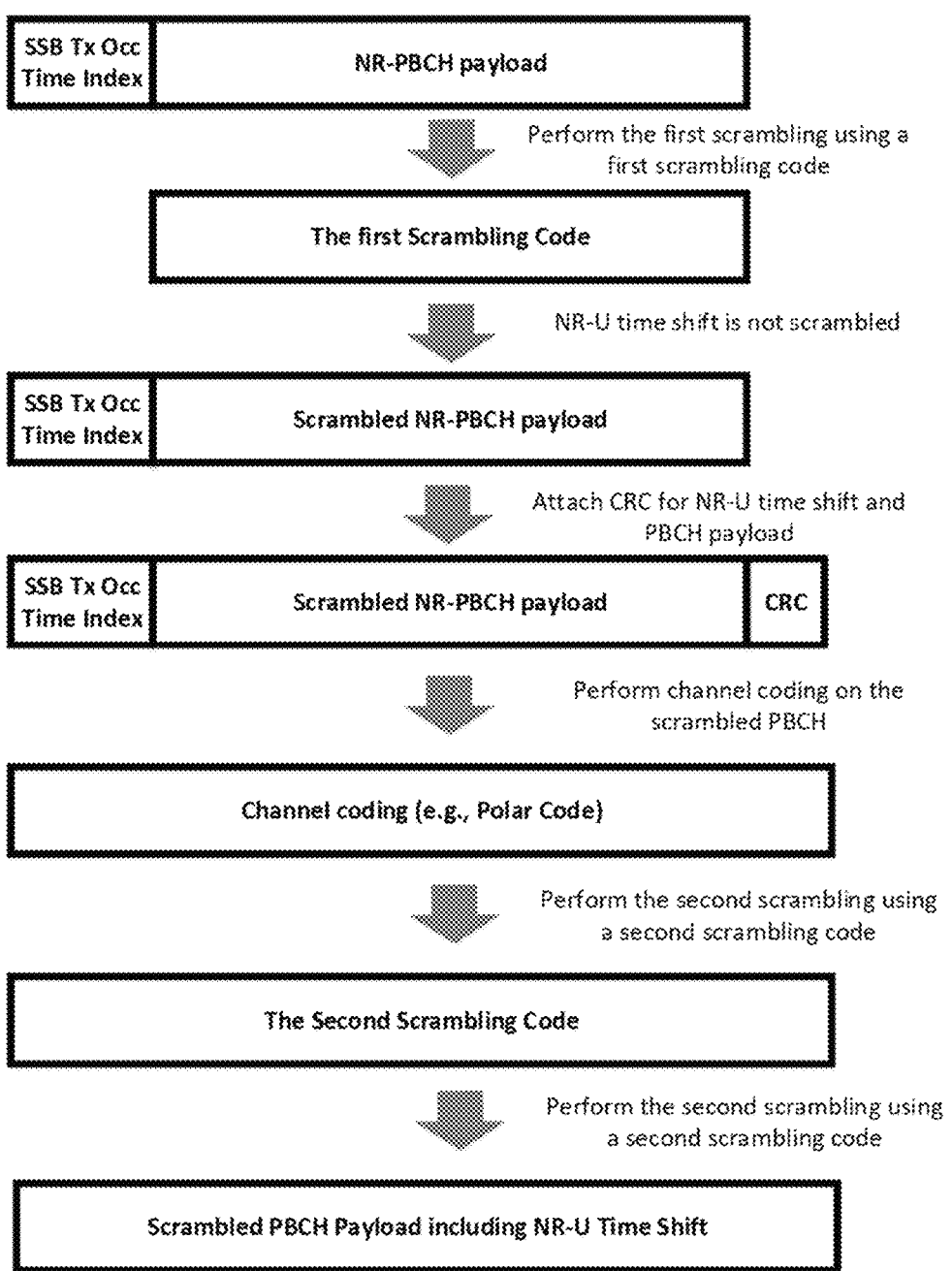
Figure 5:
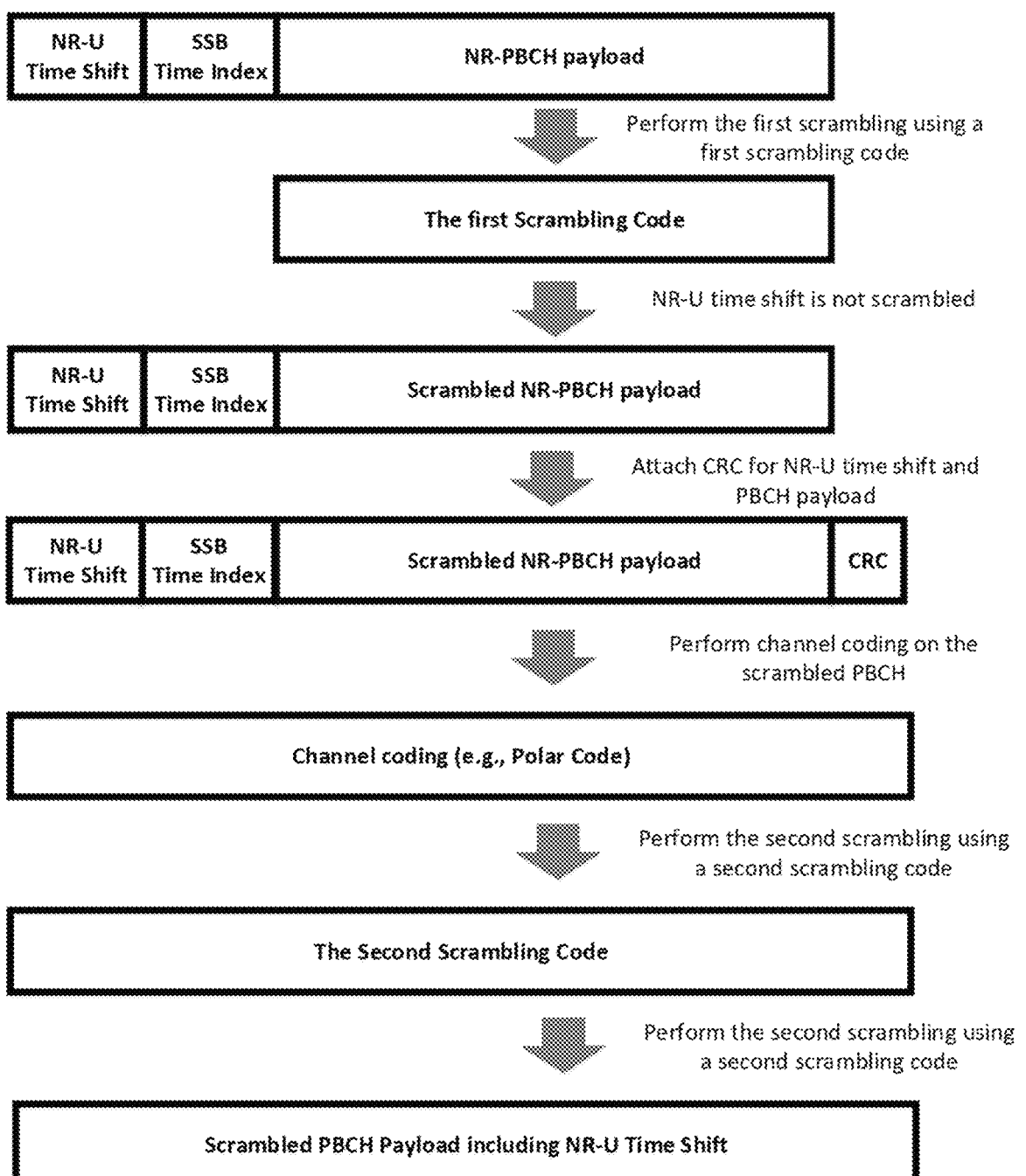
Figure 6:
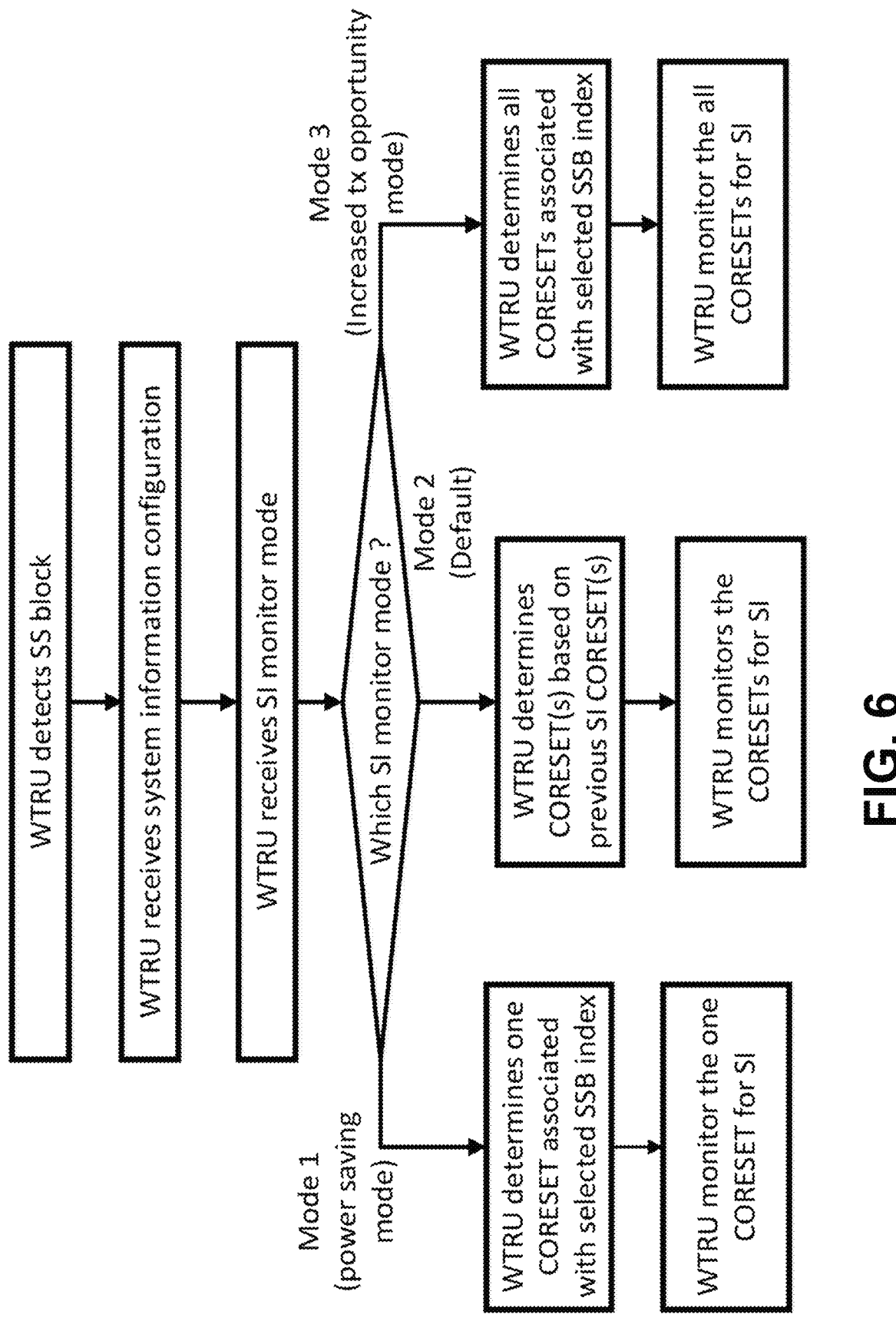
Figure 7:
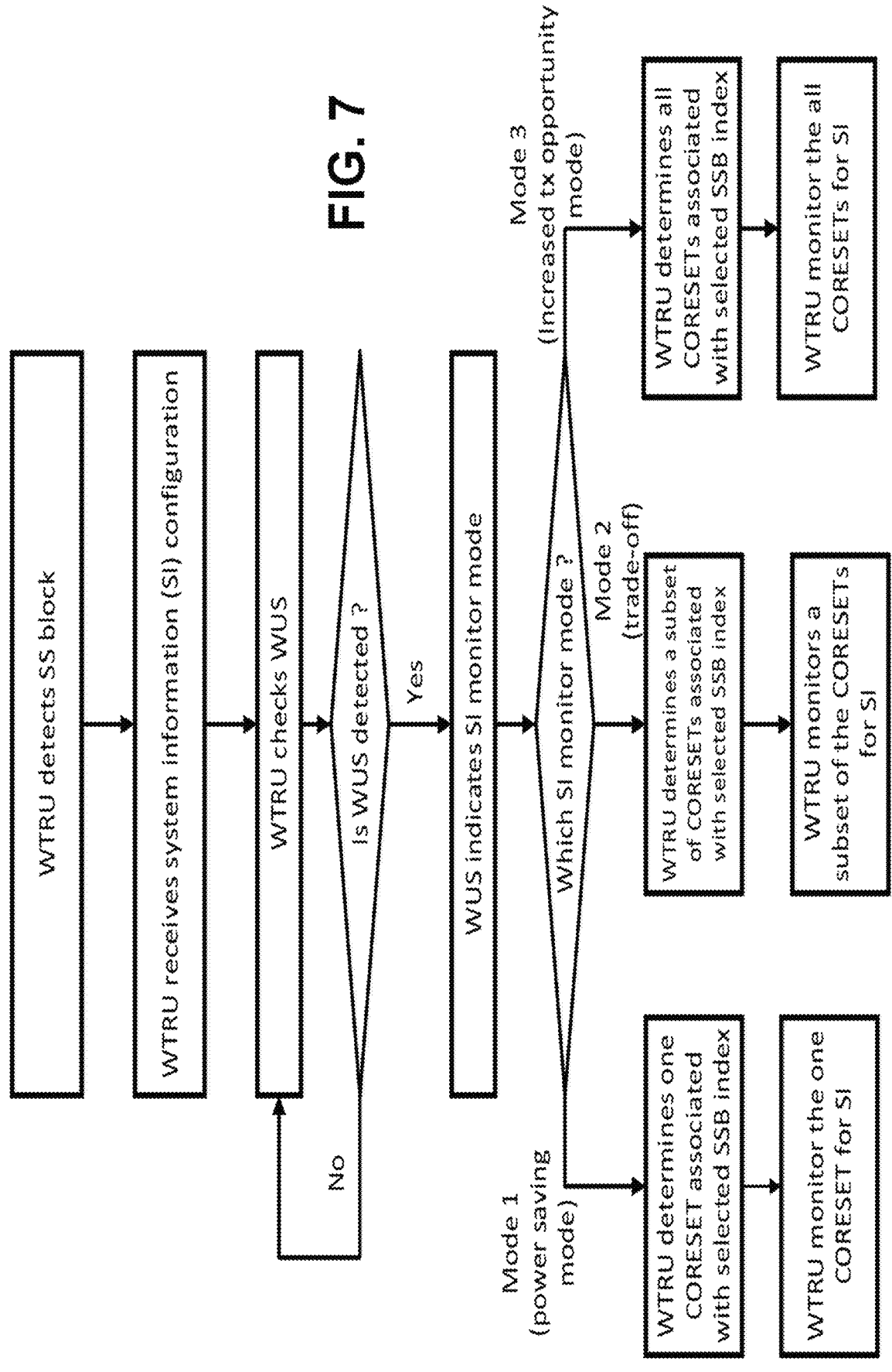
Figure 8:
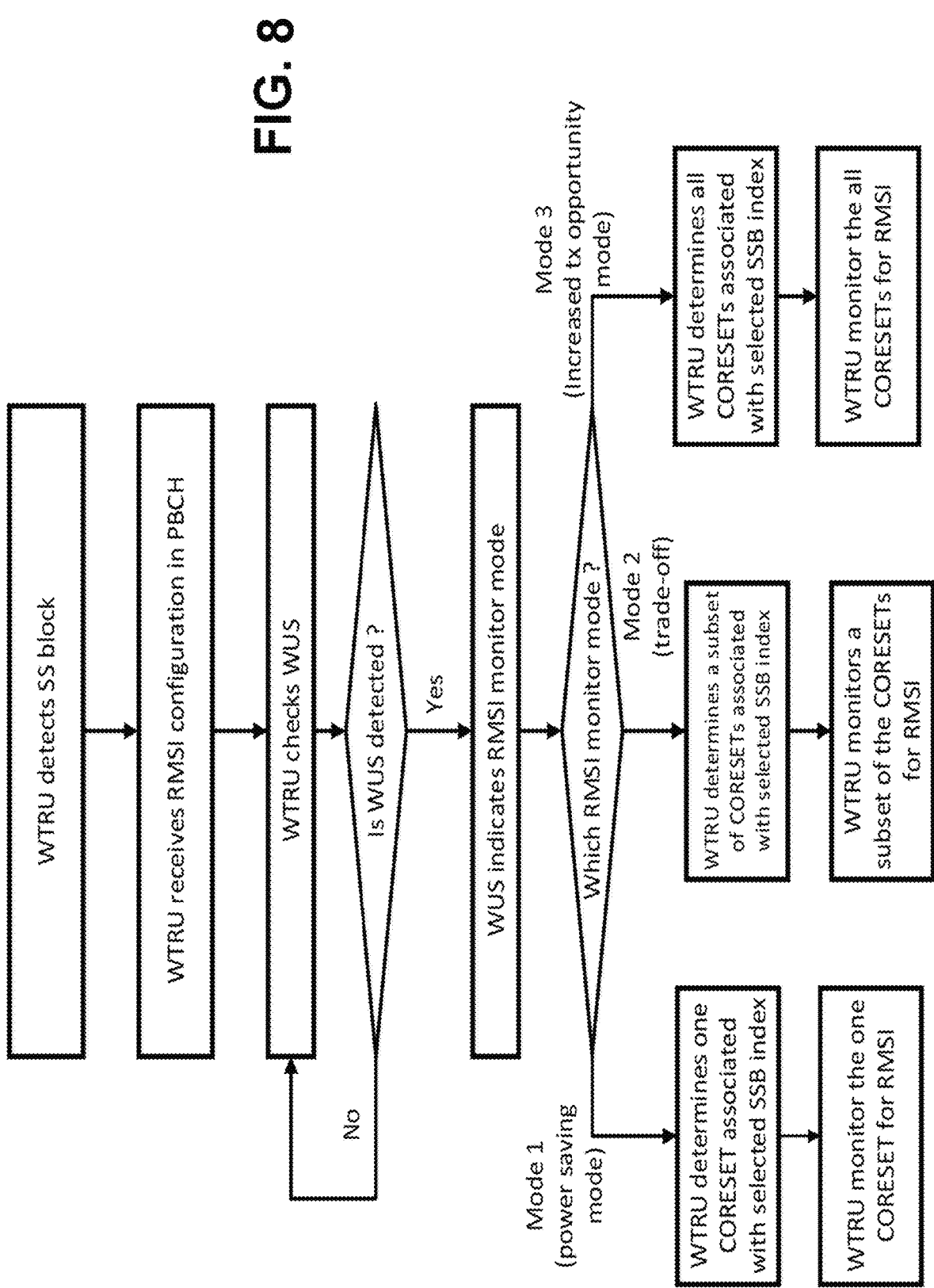
Figure 9:
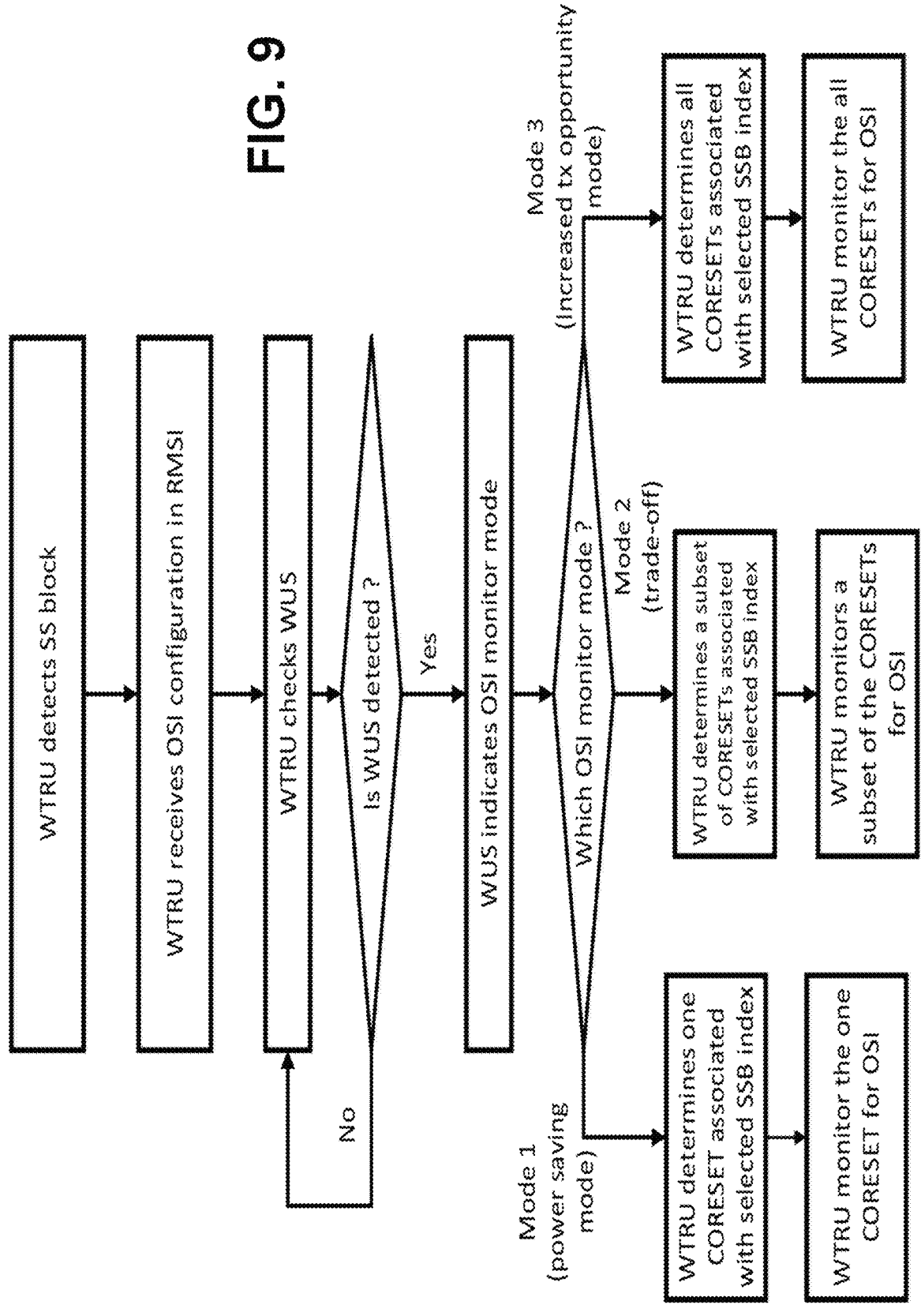
Figure 10:
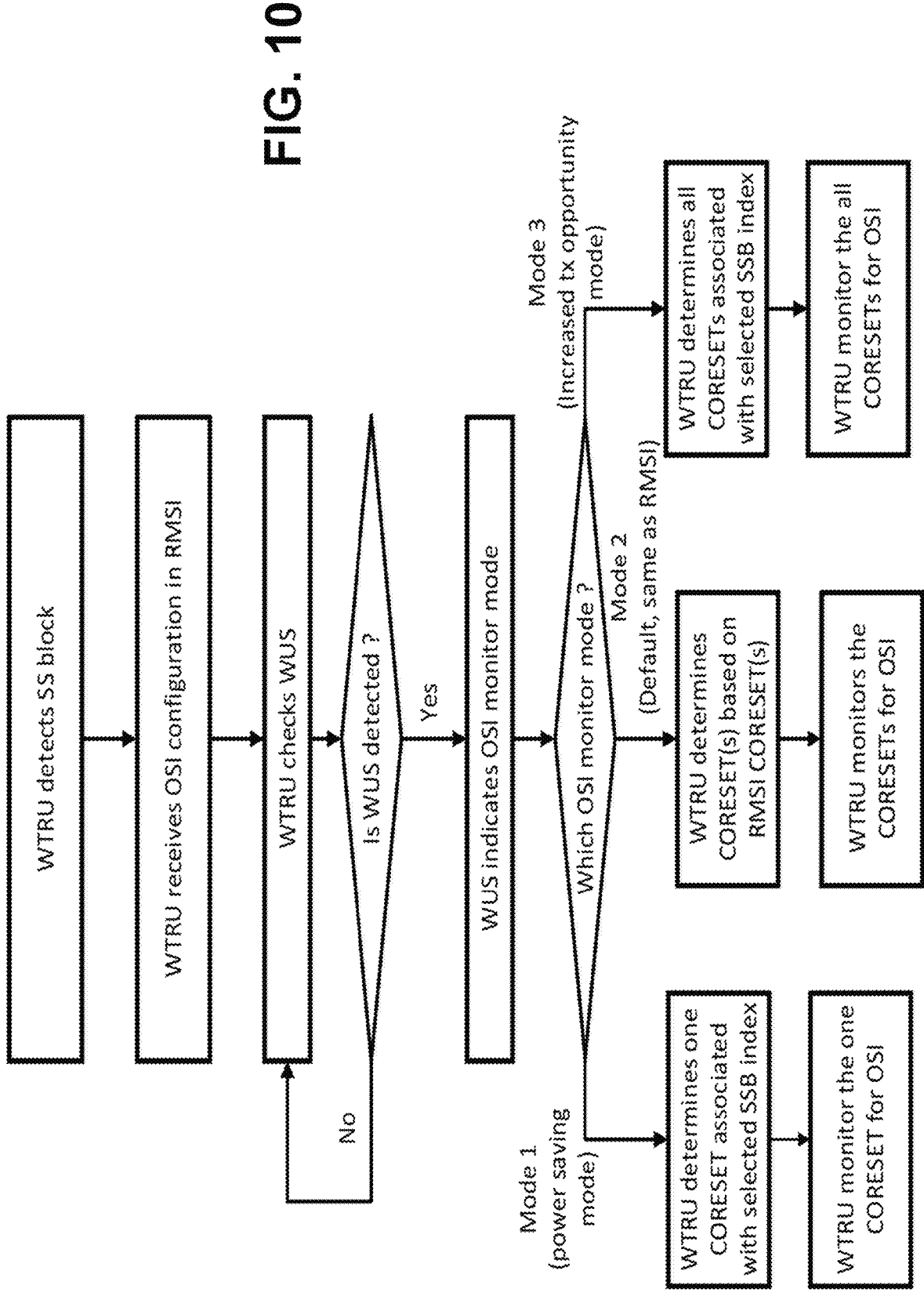

that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 2 is a diagram illustrating examples of SS/PBCH block transmission occasions and SS/PBCH block time indices;

FIG. 3 is an example of processing an SS/PBCH block transmission occasion time index;

FIG. 4 is an example of processing SSB/PBCH time shifts;

FIG. 5 is an example of jointly processing parameters, such as a time shift and an SSB time index, with an NR-PBCH payload;

FIG. 6 is an example of monitoring system information in NR-U operations;

FIG. 7 is an example of monitoring system information in NR-U operations based on a wake-up signal (WUS);

FIG. 8 is an example of monitoring remaining minimum system information (RMSI) in NR-U operations;

FIG. 9 is an example of monitoring other system information (OSI) in NR-U operations;

FIG. 10 is an example of monitoring OSI in NR-U operations; and

Figure 11:
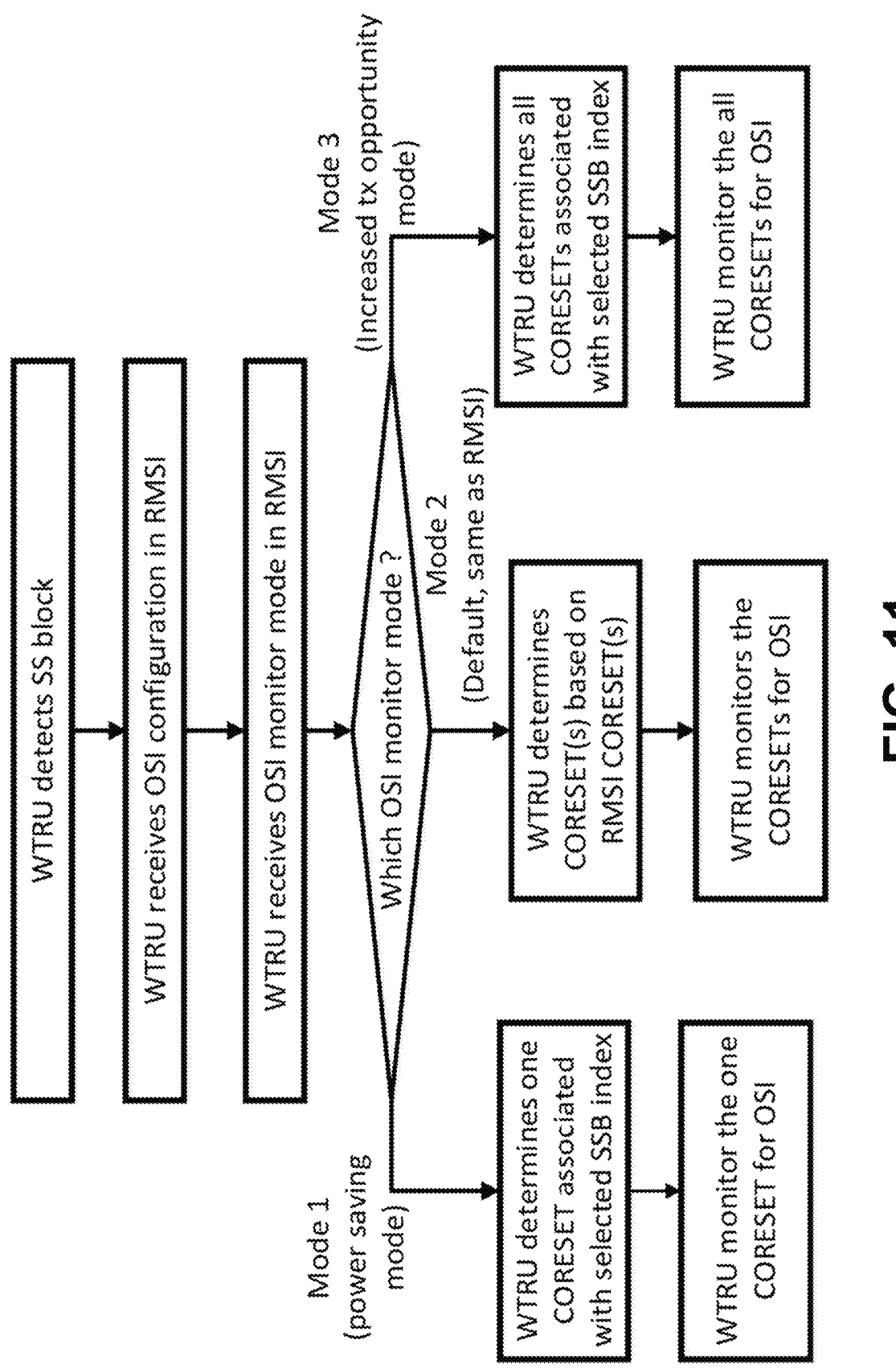

FIG. 11 is an example of monitoring OSI in NR-U operations.

DETAILED DESCRIPTION

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102 c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102 c, 102d, may be any type of device configured to operate and/or communicate in a wireless environment. By way of example, the WTRUs 102a, 102b, 102 c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102 c, and 102d, may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102 c, 102d, to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102 c, 102d, over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102 c, may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102 c, may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102 c, may implement a radio technology such as NR Radio Access, which may establish the air interface 116 using New Radio (NR).

In an embodiment, the base station 114a and the WTRUs 102a, 102b, 102 c, may implement multiple radio access technologies. For example, the base station 114a and the WTRUs 102a, 102b, 102 c, may implement LTE radio access and NR radio access together, for instance using dual connectivity (DC) principles. Thus, the air interface utilized by WTRUs 102a, 102b, 102 c, may be characterized by multiple types of radio access technologies and/or transmissions sent to/from multiple types of base stations (e.g., a eNB and a gNB).

In other embodiments, the base station 114a and the WTRUs 102a, 102b, 102 c, may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102 c, 102d, may implement a radio technology such as IEEE 802.11 to establish a wireless local area network (WLAN). In an embodiment, the base station 114b and the WTRUs 102 c, 102d, may implement a radio technology such as IEEE 802.15 to establish a wireless personal area network (WPAN). In yet another embodiment, the base station 114b and the WTRUs 102 c, 102d, may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102 c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000iMAX, E-UTRA, or WiFi radio technology.

The CN 106/115 may also serve as a gateway for the WTRUs 102a, 102b, 102 *c*, 102d, to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102 *c*, 102d, in the communications system 100 may include multi-mode capabilities (e.g., the WTRUs 102a, 102b, 102 *c*, 102d, may include multiple transceivers for communicating with different wireless networks over different wireless links). For example, the WTRU 102 *c*, shown in FIG. 1A may be configured to communicate with the base station 114a which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102 c, over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102 c, over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 nterface and may serve as a control node. For example, the MME 162 may be responsible for authenticating users of the WTRUs 102a, 102b, 102 c, bearer activation/deactivation, selecting a particular serving gateway during an initial attach of the WTRUs 102a, 102b, 102 c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102 c. The SGW 164 may perform other functions, such as anchoring user planes during inter-eNode B handovers, triggering paging when DL data is available for the WTRUs 102a, 102b, 102 c, managing and storing contexts of the WTRUs 102a, 102b, 102 c, and the like.

The SGW 164 may be connected to the PGW 166, which may provide the WTRUs 102a, 102b, 102 c, with access to packet-switched networks, such as the Internet 110, to facilitate communications between the WTRUs 102a, 102b, 102 c, and IP-enabled devices.

The CN 106 may facilitate communications with other networks. For example, the CN 106 may provide the WTRUs 102a, 102b, 102 c, with access to circuit-switched networks, such as the PSTN 108, to facilitate communications between the WTRUs 102a, 102b, 102 c, and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102 c, with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102 c, over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102 c, over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a, may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a, and gNB 180b (and/or gNB 180c).

The WTRUs 102a, 102b, 102 c, may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102 c, may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102 c, in a standalone configuration and/or a non-standalone configuration. In the standalone configuration, WTRUs 102a, 102b, 102 c, may communicate with gNBs 180a, 180b, 180c without also accessing other RANs (e.g., such as eNode-Bs 160a, 160b, 160c). In the standalone configuration, WTRUs 102a, 102b, 102 c, may utilize one or more of gNBs 180a, 180b, 180c as a mobility anchor point. In the standalone configuration, WTRUs 102a, 102b, 102 c, may communicate with gNBs 180a, 180b, 180c using signals in an unlicensed band. In a non-standalone configuration WTRUs 102a, 102b, 102 c, may communicate with/connect to gNBs 180a, 180b, 180c while also communicating with/connecting to another RAN such as eNode-Bs 160a, 160b, 160c. For example, WTRUs 102a, 102b, 102 c, may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102 c, and gNBs 180a, 180b, 180c may provide additional coverage and/or throughput for servicing WTRUs 102a, 102b, 102 c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102 c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102 c, based on the types of services being utilized WTRUs 102a, 102b, 102 c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102 c, with access to packet-switched networks, such as the Internet 110, to facilitate communications between the WTRUs 102a, 102b, 102 c, and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102 c, with access to the other networks 112, which may include other wired and/or wireless networks that are owned and/or operated by other service providers. In one embodiment, the WTRUs 102a, 102b, 102 c, may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Path loss may limit the sufficiency of coverage areas, for example, as carrier frequencies increase. Transmissions (e.g., in millimetre wave systems) may suffer from non-line-of-sight losses including diffraction loss, penetration loss, Oxygen absorption loss, foliage loss, etc. Base stations and/or WTRUs may, e.g., during initial access, be configured to overcome path losses and discover each other. Multiple (e.g., dozens or hundreds of) antenna elements may be utilized to generate beam formed signals to compensate for path loss, for example, by providing beam forming gains. Beamforming techniques may include digital, analog and/or hybrid (e.g., a mixture of digital and analog) beamforming.

A WTRU may perform cell search to acquire time and/or frequency synchronization with a cell. A WTRU may detect the Cell ID of that cell, e.g., via the cell search. In examples (e.g., in an LTE system), synchronization signals may be transmitted in one or more subframes (e.g., the 0th and 5th subframes) of a (e.g., every) radio frame. Such synchronization signals may be used for time and frequency synchronization, for example during initialization. A WTRU may, e.g., as part of the system acquisition process, synchronize (e.g., sequentially) to OFDM symbols, slots, subframes, half-frames, and/or radio frames based on the synchronization signals.

The synchronization signals may include a Primary Synchronization Signal (PSS), which may be used to obtain slot, subframe and/or half-frame boundaries. A PSS may provide physical layer cell identity (PCI) within a cell identity group.

The synchronization signals may include a Secondary Synchronization Signal (SSS), which may be used to obtain radio frame boundaries. An SSS may enable a WTRU to determine an associated cell identity group, e.g., which may range from 0 to 167.

A WTRU may, e.g., following a successful synchronization and/or PCI acquisition, decode a Physical Broadcast Channel (PBCH). The WTRU may decode the PBCH with the help of a cell-specific reference signal (CRS). The WTRU may acquire master information block (MIB) information regarding system bandwidths, System Frame Numbers (SFNs) and/or physical HARQ indicator channel (PHICH) configurations.

In examples (in LTE systems), synchronization signals and/or PBCH may be transmitted continuously according to a periodicity, which may be standardized.

Paging may be used for connection setup (e.g., network-initiated connection setup), for example, when a WTRU is in RRC_IDLE. In examples (e.g., in LTE systems), a mechanism similar to (e.g., the same mechanism as) that used for downlink data transmission (e.g., on a downlink shared channel (DL-SCH)) may be used by a WTRU to monitor L1/L2 control signaling for downlink scheduling assignments related to paging. In examples (e.g., when the location of the WTRU is unknown at a cell level), a paging message may be transmitted across multiple cells in a tracking area.

A WTRU may be allowed, e.g., for paging purposes, to sleep without receiving paging information most of the time and to briefly wake up at predefined time intervals to monitor paging information from the network. A paging cycle (e.g., a DRX cycle) may be defined to allow a WTRU to sleep most of the time and briefly wake up to monitor L1/L2 control signaling. If the WTRU detects a group identity used for paging (e.g., the CRC of DCI may be scrambled using a P-RNTI to provide a paging indication) when the WTRU wakes up, it may process the corresponding downlink paging message transmitted on a corresponding physical channel (PCH) such as the PDCCH. The paging message may include the identity of the WTRU(s) being paged. A WTRU not finding its identity may discard the received information and go back to sleep according to the DRX cycle.

A network entity may configure in which subframe or subframes a WTRU should wake up and listen for paging messages. The configuration may be cell specific. The configuration may be complemented by one or more terminal-specific configurations. A WTRU may determine the frame in which the WTRU should wake up and search for the P-RNTI on the PDCCH. The determination may be made based on an equation. Input to the equation may include the identity of the WTRU, a cell-specific paging cycle, and/or a WTRU specific paging cycle. The paging cycle may range from once per 256 frames to once per 32 frames. A WTRU may determine the subframe(s) within a frame in which the WTRU may monitor for paging based on an international mobile subscriber identity (IMSI) (e.g., which may be linked to the subscription of a user). Different WTRUs may use (e.g., based on computation) different paging instances, for example, since the WTRUs may have different IMSIs. The network may allow paging to be transmitted more often (e.g., more often than once per 32 frames). Not all WTRUs can be paged at all paging occasions, e.g., as the WTRUs may be distributed across the possible paging instances.

Paging messages may be transmitted (e.g., only transmitted) in one or more subframes. The frequency/cycle at which paging messages may be transmitted may range from one subframe per 32 frames to four subframes in every frame (e.g., in systems of a high paging capacity). From a network perspective, the cost of having a short paging cycle may be minimal as resources not used for paging can be used for normal data transmission. From a WTRU perspective, a short paging cycle may increase the power consumption of the WTRU (e.g., as the WTRU may wake up frequently to monitor for paging messages).

Paging may be used to inform WTRUs in RRC_IDLE and/or RRC_CONNECTED about changes of system information and/or about emergency situations.

A gNB or WTRU may be configured to perform a listen-before-talk (LBT) operation, for example, before the gNB or WTRU accesses a unlicensed wireless channel (e.g., in a unlicensed band). Specifics of the LBT operation may depend on the regulatory requirements for the unlicensed channel. The LBT operation may utilize a fixed-duration and/or a random-duration interval at which a wireless node (e.g., a gNB or a WTRU) may listen to a medium. The wireless node may refrain from transmitting a wireless signal, e.g., if the energy level detected from the medium is more than a threshold (e.g., a threshold specified by regulatory requirements). The wireless node may transmit a wireless signal after completion of the LBT procedure, e.g., if the energy level detected from the medium is not more than the threshold.

In some regulatory regimes, LBT may be required for unlicensed channel usage. In examples such as 3GPP license assisted access (LAA), enhanced license assisted access (eLAA) and future enhanced license assisted access (fe-LAA), various LBT categories may be adopted, including a LBT Category 4 (CAT 4) scheme adopted for LAA/eLAA. A wireless device (e.g., an eNB, gNB, or WTRU) may start a LBT CAT 4 operation when the device wants to transmit control or data in an unlicensed channel. The device may conduct an initial clear channel assessment (CCA), through which the device may check whether the unlicensed channel has been idle for a period of time (e.g., a sum of a fixed period of time and a pseudo-random duration). The device may determine the availability of the channel by comparing the level of energy detected (ED) across the bandwidth of the channel to an energy threshold (e.g., an energy threshold specified by regulatory requirements).

If the channel is determined to be free, the wireless device (e.g., the eNB, gNB or WTRU) may proceed with a transmission. If the channel is not free, the device may conduct a slotted random back-off operation, where a random number (e.g., a back-off period) may be selected from a specified interval (e.g., a contention window). A back-off countdown (e.g., a back-off counter) may be started. Whether the channel is idle or not may be verified. A transmission may be initiated when the back-off counter goes to zero. The wireless device may be allowed (e.g., only allowed) to transmit for a limited duration referred to as the maximum channel occupancy time (MCOT), e.g., after the device has gained access to the channel. The CAT 4 LBT operations described herein (e.g., with random back-off and variable contention window sizes) may enable fair channel access and/or coexistence of multiple Radio Access Technologies (RATs) (e.g., including cellular, Wi-Fi and other LAA technologies).

An unlicensed band operation may rely on the assistance of a primary component carrier in a licensed band, e.g., for license assisted non-standalone access. In examples (e.g., in new radio unlicensed (NR-U) standalone operations), one or more (e.g., all) functionalities and/or features may be fulfilled on an unlicensed band including initial access. Initial access may be enabled in a licensed band to be compatible with unlicensed band operations, for example, due to spectrum characteristics and/or regulatory requirements such as the uncertainty of channel availability, the occupied channel bandwidth (OCB) requirements, etc. In some unlicensed bands (e.g., the 5 GHz band), there may be transmission power spectral density (PSD) limitations. Power boosting of a synchronization signal may not be possible in an unlicensed band, e.g., due to one or more PSD requirements. Lack of power boosting may result in poorer synchronization performance.

SS blocks may be present (e.g., consecutively) per SS burst set for NR licensed band operations (e.g., for synchronization signals and/or for NR PBCH). The transmission bandwidths (e.g., maximum transmission bandwidths) of an SS block may include 5, 10, 40 and/or 80 MHz with 15, 30, 120 and/or 240 KHz subcarrier spacing, respectively. SS block locations within a slot may not be suitable for NR unlicensed band operations (e.g., due to LBT failures). This may result in performance degradation of SS block detection. The uncertainty of channel availability may impact SS burst configurations such as the periodicity and/or time-window size of an SS burst set. OCB requirements may not be considered for the transmission bandwidths of SS blocks. SS blocks that may fulfill LBT and/or OCB requirements may be provided for NR-U.

A paging cycle may be defined to allow a WTRU to monitor paging messages at predefined times. The uncertainty of channel availability may cause the failure of paging DCI and/or paging messages (e.g., for paging message transmitted on unlicensed bands), and may cause a WTRU to not receive the corresponding paging messages. Paging occasions may be blocked due to LBT failures.

A discovery reference signal (DRS) may be integrated with beam-based NR-U. Efficient DRS schemes may be implemented, e.g., for a system with a high number of beams. If transmitted without PDCCH/PDSCH, a DRS may occupy a small bandwidth (BW). One or more devices (e.g., WTRUs) may be configured to monitor (e.g., sense) the transmission medium. The one or more devices may find certain spectrum(s) to be empty and may transmit using those spectrums. This may result in failed DRS transmissions. A large number of beams may be used in some use cases (e.g., in the >6 GHz case). The total DRS measurement timing configuration (DMTC) duration may be large. A WTRU may be configured to listen before using a DRS beam. The DRS for a specific beam may be skipped, for example, if there is an interfering device. Additional delays may be introduced, e.g., as a resulting of the skipping.

An LBT scheme (e.g., with corresponding LBT requirements) may support single or multiple switching points and may include gaps of 16 uS, 16-25 uS and/or gaps greater than 25 uS. Different LBT schemes may be used for different gaps. These gaps may use random access channel (RACH) occasions or other uplink transmissions, which may exceed 25 uS. A signal capable of facilitating its detection with low complexity may be utilized. The information content in PBCH (e.g., PBCH payload) may change from one SS/PBCH block to another. Soft combining for PBCH intra-system frame number (SFN) or for inter-subframe may be difficult.

In wireless systems such as NR-U, an SSB (e.g., which may refer to an SS/PBCH block as discussed herein) may change in time location or may be time shifted, e.g., due to channel uncertainty or LBT failure(s). For example, an SSB reception may not occur at an expected time because of channel uncertainty or LBT failure(s). A time shift or time offset may be included (e.g., indicated) in an SS/PBCH block so that when a WTRU detects the SS/PBCH block, the WTRU may obtain such time shift or time offset (e.g., offset 205 illustrated in FIG. 2 where SSB0 of Tx Occasion 0 is time shifted/offset to a time after time 0). The WTRU may determine timing information, for example, a WTRU may determine a frame boundary, subframe boundary, slot boundary, and/or symbol timing (e.g., associated with received SSB(s), where the received SSB(s) may be one or more of the SSBs illustrated in FIG. 2). The WTRU may determine the timing information based on the time shift/offset and an SS/PBCH block time index. For example, within each Tx occasion, an SS/PBCH block time index provides timing information for SS/PBCH blocks. In an example where the first Tx occasion (Tx occasion 0) begins at frame boundary plus an offset 205 as shown in FIG. 2, when the WTRU detects an SS/PBCH block (e.g., SS/PBCH block k) in the Tx occasion 0, the WTRU may determine how far away this WTRU is from the frame boundary. An SS/PBCH block may have a fixed duration denoted as Tssb (e.g., Tssb=4 symbols duration), and the frame boundary denoted as Tf may be determined as $$Tf=tc-(\text{offset } 205+k\times Tssb)$$

where tc is the beginning time of SS/PBCH block k, and k×Tssb means k times Tssb.

In an example where the WTRU detects an SS/PBCH block (say SS/PBCH block k) in Tx occasion m, the WTRU can determine how far away this WTRU is from frame boundary based on the Tx occasion m, SS/PBCH block k, and offset 205. An SS/PBCH block may have a fixed duration denoted as Tssb (e.g., Tssb=4 symbols duration) and a Tx occasion may have a fixed duration denoted as T_txo (T_txo=L×Tssb, or T_txo equals to L times Tssb), and the frame boundary denoted as Tf may be determined as $$Tf=tc-(\text{offset } 205+k\times Tssb+m\times T\_txo)$$

where tc is the beginning time of SS/PBCH block k of Tx occasion m, k×Tssb means k times Tssb and m×T_txo means m times T_txo.

Multiple SS/PBCH transmission occasions may be utilized (e.g., in addition to or instead of time shifts or time offsets), for example, to cope with LBT failure(s). An SS/PBCH transmission occasion time index may be sent to a receiving WTRU and used by the receiving WTRU to determine timing information. The SS/PBCH transmission occasion time index may be included (e.g., indicated) in an SS/PBCH block. When a WTRU detects an SS/PBCH block, the WTRU may obtain the SS/PBCH transmission occasion time index and/or the SS/PBCH block time index. The WTRU may be able to obtain physical and/or system timing information, e.g., using the SS/PBCH transmission occasion time index and/or the SS/PBCH block time index. For example, using the SS/PBCH transmission occasion time index in combination with the SS/PBCH block index, the WTRU may be able to determine timing information such as a frame boundary, subframe boundary, slot boundary and/or symbol timing.

FIG. 2 illustrates an example use of SS/PBCH block transmission occasions and SS/PBCH block time indices, e.g., in NR-U. As shown, there may be L SS/PBCH blocks (SSBs) associated with a (e.g., each) SS/PBCH block transmission (Tx) occasion. The SS/PBCH blocks (e.g., in a Tx Occasion) may be indexed with SSB index 0, 1, . . . , L–1. There may be M SS/PBCH block transmission occasions. These transmission occasions may be indexed in time using SS/PBCH block transmission occasion time index 0, 1, . . . , M–1. In examples, SSB0 of Tx Occasion 0 may be offset from time 0 by offset 205.

In the example of FIG. 2, LBT may be performed (e.g., by the transmitter of the SSBs) starting with SSB0 of SS/PBCH block transmission occasion 0. If LBT is successful, an SSB may be transmitted. If LBT fails for SSB0, the operation may continue with SSB1. If LBT for SSB1 is successful, SSB1 may be transmitted. SSB0 of block Tx occasion 0 may be transmitted in a subsequent SSB0 time location (e.g., the next SSB0 time location in the next SS/PBCH block transmission occasion such as SS/PBCH block transmission occasion 1), for example when LBT failed for SSB0 in Tx Occasion 0. A WTRU may, e.g., in such a case, detect SSB0 in SS/PBCH block transmission occasion 1. If the WTRU does not possess timing information for SS/PBCH block transmission occasions, the location of SSB0 may become ambiguous, e.g., since the WTRU may not know in which time location SSB0 is detected. For example, as shown in FIG. 2, there may be M SS/PBCH block transmission occasions, and the WTRU may not know which SS/PBCH block transmission occasion that SSB0 is detected in. With such ambiguity, the WTRU may not be able to obtain the relevant timing information such as the frame boundary, subframe boundary, slot boundary, and/or symbol timing. An SS/PBCH block may include (e.g., indicate) the SS/PBCH block transmission occasion time index information and/or the corresponding SS/PBCH block time index information so that timing information may be determined by a WTRU receiving the SS/PBCH block.

Parameters associated with determining timing information (e.g., associated with NR-U) may include one or more of the following: a time shift, a time offset, an SS/PBCH block transmission occasion time index, an SS/PBCH block time index, a slot indication, a non-slot or mini-slot indication, a half radio frame indication, a system frame indication, etc. An SS/PBCH block may include (e.g., in the block composition) an RMSI, a CSI-RS, an OSI, a paging message, other signal(s), and/or other channel(s). In examples (e.g., when RMSI, a CSI-RS, or another signal or channel is included in the SS/PBCH block), parameters (e.g., as described herein) such as time shifts and/or SS/PBCH block transmission occasion time indices may be included in the RMSI and/or in another signal or channel (e.g., in the OSI). Such parameters may alternatively or additionally be included in a PBCH (e.g., in the PBCH or in a PBCH DMRS).

A WTRU may be indicated with one or more SS/PBCH block transmission occasion time indices, one or more SS/PBCH block time indices, one or more time shifts/time offsets. Hybrid SS/PBCH block time indices may be used. Such hybrid SS/PBCH time indices and/or hybrid NR-U parameters (e.g., associated with determining timing information) may comprise one or more SS/PBCH block transmission occasion time indices and/or one or more SS/PBCH block time indices. The hybrid SS/PBCH time indices may comprise SS/PBCH block time shifts/time offsets. The hybrid NR-U parameters (e.g., associated with determining timing information) may include half radio frames and/or system frame numbers.

A WTRU may detect an SSB. A WTRU may determine whether an SSB's association with a predefined transmission opportunity is configured or not. If such an association is configured, the WTRU may use the corresponding SS/PBCH block transmission occasion time index to acquire relevant timing information such as frame boundary, subframe boundary, and/or slot boundary. The WTRU may use the SS/PBCH block transmission occasion time index in combination with a time shift/time offset to acquire the timing information. If an SSB's association with a predefined transmission opportunity is configured, the WTRU may use a hybrid SS/PBCH time index to acquire the timing information (e.g., frame boundary, subframe boundary, and/or slot boundary). Configuration information may be carried in an SS/PBCH block, for example, in a PSS and/or SSS, or in the PBCH (e.g., in a PBCH DMRS, a PBCH payload, or a combination of both).

A WTRU may receive configuration information and may interpret timing information and/or parameters according to the configuration information. Joint source coding may be applied to an SS/PBCH block transmission occasion time index and an SS/PBCH block time index. Joint source coding may be applied to an SS/PBCH block transmission occasion time index, an SS/PBCH block time index and/or a time shift. Joint source coding for a hybrid SS/PBCH index may use one or more of PSS, SSS, PBCH payload, PBCH DMRS, and/or scrambling.

FIG. 3 is an example of processing a parameter, such as an SS/PBCH block transmission occasion time index, with an NR-PBCH payload, e.g., in NR for example. As shown in FIG. 3, the SS/PBCH block transmission occasion time index may be attached to an NR-PBCH payload. As shown in FIG. 3, the NR-PBCH payload may be scrambled using a first scrambling sequence or scrambling code. As shown in FIG. 3, the SS/PBCH block transmission occasion time index may not be scrambled by the first scrambling sequence or code. The unscrambled SS/PBCH block transmission occasion time index and the scrambled NR-PBCH payload may be attached to each other, and as shown in FIG. 3, a CRC may be added (e.g., attached). The CRC may be generated taking into consideration that the SS/PBCH block transmission occasion time index and the NR-PBCH payload may be joined together (e.g., attached to each other). As shown in FIG. 3, the SS/PBCH block transmission occasion time index, the scrambled NR-PBCH payload (e.g., scrambled by the first scrambling sequence or code) and/or the CRC may be encoded using a channel coding scheme such as a Polar coding scheme. As shown in FIG. 3, the encoded SS/PBCH block transmission occasion time index, the scrambled NR-PBCH payload, and the CRC may be scrambled using a second scrambling sequence or code. The SS/PBCH block, e.g., as processed, may be transmitted (e.g., in examples subject to LBT) and decoded (e.g., via a reverse mechanism) at a receiving WTRU. FIG. 4 is an example of processing a parameter, such as a time shift or a time offset, with an NR-PBCH payload, As shown in FIG. 4, a time shift or a time offset may be attached to an NR-PBCH payload. As shown in FIG. 4, the NR-PBCH payload may be scrambled using a first scrambling sequence or scrambling code. As shown in FIG. 4, the time shift/time offset may not be scrambled by the first scrambling sequence or code. The unscrambled time shift/time offset and the scrambled NR-PBCH payload may be attached to each other, and as shown in FIG. 4, and a CRC may be added (e.g., attached). The CRC may be generated taking into consideration that the time shift/time offset and the NR-PBCH payload may be joined together (e.g., attached to each other). As shown in FIG. 4, the time shift/time offset, the scrambled NR-PBCH payload (e.g., scrambled by the first scrambling sequence or code) and/or the CRC may be encoded using a channel coding scheme such as a Polar coding scheme. As shown in FIG. 4, the encoded time shift/time offset, the encoded scrambled NR-PBCH payload, and the encoded CRC may be scrambled using a second scrambling sequence or code. The SS/PBCH block, e.g., as processed, may be transmitted (e.g., in examples subject to LBT) and decoded (e.g., via a reverse mechanism) at a receiving WTRU.

The first scrambling sequence or code described herein may depend on (e.g., be based on or be derivable as a function of) at least one of a Cell ID or an SFN.

The first scrambling sequence or code may depend (e.g., be based on or be derivable as a function of at least one of timing information (e.g., NR-U timing information for example), an NR-U time shift, an SS/PBCH transmission occasion time index, a Half radio frame indication, or an SFN.

The second scrambling sequence or code described herein may depend on (e.g., be based on or be derivable as a function of) at least one of a Cell ID or an SS/PBCH block time index.

The second scrambling sequence or code may depend (e.g., be based on or be derivable as a function of) at least one of timing information (e.g., NR-U timing information for example), an SS/PBCH transmission occasion time index, an NR-U time shift, a half radio frame indication, or an SFN.

FIG. 5 is an example of joint processing of parameters, such as a time shift and an SSB time index, with an NR-PBCH payload. As shown in FIG. 5, the time shift and the SSB time index may be attached to an NR-PBCH payload. As shown in FIG. 5, the NR-PBCH payload may be scrambled using a first scrambling sequence or scrambling code. As shown in FIG. 5, the time shift and the SSB time index may not be scrambled by the first scrambling sequence or code. As shown in FIG. 5, a CRC may be attached to the combined time shift, SSB time index, and scrambled NR-PBCH payload. As shown in FIG. 5, the CRC may be generated taking into consideration that the time shift, SSB time index, and scrambled NR-PBCH payload may be joined together. As shown in FIG. 5, the time shift, the SSB time index, the scrambled NR-PBCH payload (e.g., scrambled by the first scrambling sequence or code), and the CRC may be encoded using a channel coding scheme such as a Polar coding scheme. As shown in FIG. 5, the encoded time shift, SSB time index, scrambled NR-PBCH payload, and CRC may be scrambled using a second scrambling sequence or code. The SS/PBCH block, e.g., as processed, may be transmitted (e.g., in examples subject to LBT) and decoded (e.g., via a reverse mechanism) at a receiving WTRU.

Information associated with an SSB such as a transmission occasion time index, a block time index, or a time offset may be processed jointly or separately, e.g., as shown in FIGS. 3-5.

System information (SI) monitoring may switch between different modes, e.g., between a power saving mode and a normal mode. For example, one remaining minimum system information (RMSI) control resource set (CORESET), a subset of all RMSI CORESETs, or all RMSI CORESETs may be monitored. A short signal may be used to indicate the mode for system information CORESET monitoring. If LBT is successful, a WTRU may switch to a power saving mode to monitor one or more CORESETS. If LBT fails, the WTRU may switch to a fallback mode to monitor one or more (e.g., all) CORESETs without power saving. A short signal may be used to indicate an SI change. A WTRU may read (e.g., interpret) the short signal for power saving purposes. The short signal may be a wake-up signal (WUS), a special signal, an initial signal, or the like. Such a short signal may be able to convey information despite having low complexity and/or consuming only a small amount of power.

FIG. 6 is an example of system information monitoring, e.g., associated with NR-U. A WTRU may try to detect an SS block (e.g., an SS/PBCH block). The WTRU may receive a system information configuration. The WTRU may receive an indication of a system information monitoring mode. The WTRU may be configured to operate in multiple modes, e.g., a first mode (e.g., mode 1) for power saving, a second mode (e.g., mode 2) as a default mode, and a third mode (e.g., mode 3) for increased transmission opportunities. If mode 1 is indicated (e.g., the indicated monitoring mode in the system information indicates mode 1), the WTRU may determine a CORESET (e.g., one CORESET) associated with a detected SS/PBCH block index. The WTRU may monitor the determined CORESET for a control channel via which the WTRU may receive system information. As shown in FIG. 6, if mode 2 is indicated (e.g., the indicated monitoring mode in the system information indicates mode 2), the WTRU may determine a CORESET(s) based on a previously used CORESET(s). The WTRU may monitor the determined CORESET(s) for a control channel via which the WTRU may receive system information. If mode 3 is indicated (e.g., the indicated monitoring mode in the system information indicates mode 3), the WTRU may increase monitoring opportunities by monitoring multiple (e.g., all) CORESETs associated with the detected SS/PBCH block index, e.g., for a control channel via which the WTRU may receive system information.

FIG. 7 is an example of short signal based or WUS-based system information monitoring, e.g., in NR-U. A WTRU may try to detect an SS/PBCH block. The WTRU may receive a system information configuration. The WTRU may try to obtain a system information monitoring mode. The WTRU may be configured to operate in multiple modes, e.g., a first mode (e.g., mode 1) for power saving, a second mode (e.g., mode 2) for trade-off between power saving and increased transmission opportunities, and a third mode (e.g., mode 3) for increased transmission opportunities.

The WTRU may try to detect a short signal or a WUS. The short signal or WUS may indicate which mode is to be used for SI monitoring. If mode 1 is indicated, the WTRU may determine a CORESET (e.g., a single CORESET) associated with a detected SS/PBCH block index. The WTRU may monitor the CORESET (e.g., the determined CORESET) for a control channel via which the WTRU may receive system information. If mode 2 is indicated, the WTRU may determine a subset of CORESETs associated with a detected SS/PBCH block index. The WTRU may monitor the subset of CORESETs for a control channel via which the WTRU may receive system information. If mode 3 is indicated, the WTRU may increase monitoring opportunities by monitoring multiple (e.g., all) CORESETs associated with the detected SS/PBCH block index, e.g., for a control channel via which the WTRU may receive system information.

FIG. 8 illustrates an example of short signal based or WUS-based RMSI monitoring, e.g., in NR-U. A WTRU may try to detect an SS/PBCH block. The WTRU may receive an RMSI configuration in a PBCH transmission. The WTRU may try to obtain an RMSI monitoring mode. The WTRU may be configured to operate in multiple modes, e.g., a first mode (e.g., mode 1) for power saving, a second mode (e.g., mode 2) for trade-off between power saving and increased transmission opportunities, and a third mode (e.g., mode 3) for increased transmission opportunities.

The WTRU may try to detect a short signal or a WUS. As shown in FIG. 8, the WTRU may determine an RMSI monitoring mode from the WUS (e.g., the short signal or WUS may indicate which mode is to be used for RMSI monitoring). If mode 1 is indicated, the WTRU may determine a CORESET (e.g., single CORESET) associated with a detected SS/PBCH block index. The WTRU may monitor the CORESET (e.g., the determined CORESET) for a control channel via which the WTRU may receive RMSI. If mode 2 is indicated, the WTRU may determine a subset of CORESETs associated with a detected SS/PBCH block index. The WTRU may monitor the subset of CORESETs for a control channel via which the WTRU may receive RMSI. If mode 3 is indicated, the WTRU may increase monitoring opportunities by monitoring CORESETS (e.g., all CORESETs) associated with the detected SS/PBCH block index, e.g., for a control channel via which the WTRU may receive system information.

FIG. 9 is an example of short signal based or WUS-based other system information (OSI) monitoring, e.g., in NR-U. A WTRU may try to detect an SS/PBCH block. The WTRU may receive an OSI configuration in RMSI. The WTRU may try to obtain an OSI monitoring mode. The WTRU may be configured to operate in multiple modes, e.g., a first mode (e.g., mode 1) for power saving, a second mode (e.g., mode 2) for trade-off between power saving and increased transmission opportunities, and a third mode (e.g., mode 3) for increased transmission opportunities.

The WTRU may try to detect a short signal or a WUS. The short signal or WUS may indicate which mode is to be used for OSI monitoring. If mode 1 is indicated, the WTRU may determine a CORESET (e.g., a single CORESET) associated with a detected SS/PBCH block index. The WTRU may monitor a CORESET (e.g., the determined CORESET) for a control channel via which the WTRU may receive OSI. If mode 2 is indicated, the WTRU may determine a subset of CORESETs associated with a detected SS/PBCH block index. The WTRU may monitor the subset of CORESETs for a control channel via which the WTRU may receive OSI. If mode 3 is indicated, the WTRU may increase monitoring opportunities by monitoring multiple (e.g., all) CORESETs associated with the detected SS/PBCH block index, e.g., for a control channel via which the WTRU may receive system information.

FIG. 10 is an example of short signal based or WUS-based OSI monitoring, e.g., in NR-U. A WTRU may try to detect an SS/PBCH block. The WTRU may receive an OSI configuration in RMSI. The WTRU may try to obtain an OSI monitoring mode. The WTRU may be configured to operate in multiple modes, e.g., a first mode (e.g., mode 1) for power saving, a second mode (e.g., mode 2) for using the same CORESET as RMSI, and a third mode (e.g., mode 3) for increased transmission opportunities.

The WTRU may try to detect a short signal or A WUS. The short signal or WUS may indicate which mode is to be used for OSI monitoring. If mode 1 is indicated, the WTRU may determine a CORESET (e.g., a single CORESET) associated with a detected SS/PBCH block index. The WTRU may monitor a CORESET (e.g., the determined CORESET) for a control channel via which the WTRU may receive OSI. If mode 2 is indicated, the WTRU may determine a subset of CORESETs associated with a CORESET of RMSI. The WTRU may monitor the same CORESETs as those monitored for RMSI for a control channel via which the WTRU may receive OSI. If mode 3 is indicated, the WTRU may increase monitoring opportunities by monitoring multiple (e.g., all) CORESETs associated with the detected SS/PBCH block index, e.g., for a control channel via which the WTRU may receive system information.

FIG. 11 is an example of OSI monitoring, e.g., in NR-U. A WTRU may try to detect an SS/PBCH block. The WTRU may receive an OSI configuration in RMSI. The WTRU may receive a configuration for an OSI monitoring mode, e.g., in RMSI. The WTRU may be configured to operate in multiple modes, e.g., a first mode (e.g., mode 1) for power saving, a second mode (e.g., mode 2) for using the same CORESET as those used for RMSI, and a third mode (e.g., mode 3) for increased transmission opportunities. If mode 1 is indicated, the WTRU may determine a CORESET (e.g., a single CORESET) associated with a detected SS/PBCH block index. The WTRU may monitor a CORESET (e.g., the determined CORESET) for a control channel via which the WTRU may receive OSI. If mode 2 is indicated, the WTRU may determine a subset of CORESETs associated with the CORESETs of RMSI. The WTRU may monitor the same CORESETs as those monitored for RMSI for a control channel via which the WTRU may receive OSI. If mode 3 is indicated, the WTRU may increase monitoring opportunities by monitoring multiple (e.g., all) CORESETs associated with the detected SS/PBCH block index, e.g., for a control channel via which the WTRU may receive system information.

Although the solutions described herein may consider LTE, LTE-A, New Radio (NR) or 5G specific protocols, it is understood that the solutions described herein are not restricted to those scenarios and may be applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit receive unit (WTRU) comprising:
    a processor configured at least to:
        receive, in a first transmission occasion, a first synchronization signal (SS)/physical broadcast channel (PBCH) block (SSB), wherein the first SSB is associated with a second transmission occasion that is different from the first transmission occasion;
        decode the first SSB, wherein being configured to decode the first SSB comprises being configured to decode a PBCH payload, a transmission occasion time index, a block time index, and a new radio unlicensed time offset of the first SSB, wherein the PBCH payload is scrambled with a first scrambling code, is channel coded, and is scrambled with a second scrambling code, and wherein the transmission occasion time index, the block time index, and the new radio unlicensed time offset are channel coded, scrambled with the second scrambling code, and not scrambled with the first scrambling code, wherein the first scrambling code is a function of a system frame number and the new radio unlicensed time offset, and wherein the second scrambling code is a function of the transmission occasion time index and the new radio unlicensed time offset;

monitor a maximum number of SSB Tx occasions (M) based on the PBCH payload;

determine, based on the transmission occasion time index, the block time index, and the new radio unlicensed time offset, new radio unlicensed timing information of the first SSB;

receive a wake-up signal that indicates a new radio unlicensed monitoring mode;

on a condition that the new radio unlicensed monitoring mode is a first monitoring mode, monitor one (CORESET) associated with the first SSB;

on a condition that the new radio unlicensed monitoring mode is a second monitoring mode, monitor a subset of CORESETs associated with the first SSB; and on a condition that the new radio unlicensed monitoring mode is a third monitoring mode, monitor all CORE-SETs associated with the first SSB.

2. The WTRU of claim 1, wherein the processor is further configured to decode a second SSB, wherein if the second SSB is from the first transmission occasion, a determination of timing information associated with the second SSB does not use transmission occasion time index information.

3. The WTRU of claim 1, wherein the first transmission occasion is Transmission Occasion 0.

4. The WTRU of claim 1, wherein being configured to determine the new radio unlicensed timing information comprises the processor being further configured to determine one or more of: a frame boundary, a subframe boundary, a slot boundary, or a symbol timing.

5. A method implemented in a wireless transmit receive unit (WTRU), the method comprising:

receiving, in a first transmission occasion, a first synchronization signal (SS)/physical broadcast channel (PBCH) block (SSB), wherein the first SSB is associated with a second transmission occasion that is different from the first transmission occasion;

decoding the first SSB, wherein decoding the first SSB comprises decoding a PBCH payload, a transmission occasion time index, a block time index, and a new radio unlicensed time offset of the first SSB, wherein the PBCH payload is scrambled with a first scrambling code, is channel coded, and is scrambled with a second scrambling code, and wherein the transmission occasion time index, the block time index, and the new radio unlicensed time offset are channel coded, scrambled with the second scrambling code, and not scrambled with the first scrambling code, wherein the first scrambling code is a function of a system frame number and the new radio unlicensed time offset, and wherein the second scrambling code is a function of the transmission occasion time index and the new radio unlicensed time offset;

monitoring a maximum number of SSB Tx occasions (M) based on the PBCH payload;

determining, based on the transmission occasion time index, the block time index, and the new radio unlicensed time offset, new radio unlicensed timing information of the first SSB;

receiving a wake-up signal that indicates a new radio unlicensed monitoring mode;

on a condition that the new radio unlicensed monitoring mode is a first monitoring mode, monitoring one (CORESET) associated with the first SSB;

on a condition that the new radio unlicensed monitoring mode is a second monitoring mode, monitoring a subset of CORESETs associated with the first SSB; and on a condition that the new radio unlicensed monitoring mode is a third monitoring mode, monitoring all CORESETs associated with the first SSB.

6. The method of claim 5, further comprising decoding a second SSB, wherein if the second SSB is from the first transmission occasion, a determination of timing information associated with the second SSB does not use transmission occasion time index information.

7. The method of claim 5, wherein the first transmission occasion is Transmission Occasion 0.

8. The method of claim 5, wherein determining the new radio unlicensed timing information comprises determining one or more of: a frame boundary, a subframe boundary, a slot boundary, or a symbol timing.

* * * * *